United States Patent
Hunt et al.

(10) Patent No.: US 9,206,702 B2
(45) Date of Patent: Dec. 8, 2015

(54) METHOD FOR REPAIRING A SHROUD TILE OF A GAS TURBINE

(75) Inventors: Mark Lawrence Hunt, Simpsonville, SC (US); Steven Charles Woods, Easley, SC (US)

(73) Assignee: General Electric Company, Schenectady, NY (US)

(*) Notice: Subject to any disclaimer, the term of this patent is extended or adjusted under 35 U.S.C. 154(b) by 983 days.

(21) Appl. No.: 13/362,410

(22) Filed: Jan. 31, 2012

(65) Prior Publication Data

US 2013/0195642 A1 Aug. 1, 2013

(51) Int. Cl.
*F01D 11/12* (2006.01)
*F01D 11/08* (2006.01)
*B23P 6/00* (2006.01)

(52) U.S. Cl.
CPC .............. *F01D 11/08* (2013.01); *B23P 6/005* (2013.01); *F05D 2230/12* (2013.01); *F05D 2230/13* (2013.01); *F05D 2230/14* (2013.01); *F05D 2230/237* (2013.01); *F05D 2230/80* (2013.01); *F05D 2240/11* (2013.01); *Y10T 29/49318* (2015.01)

(58) Field of Classification Search
CPC .............. F01D 11/12; F05D 2230/232; F05D 2230/237; F05D 2240/11
USPC ............. 415/139, 168.2, 171.1, 173.4, 173.5, 415/213.1, 214.2, 215.1, 173.1
See application file for complete search history.

(56) References Cited

U.S. PATENT DOCUMENTS

| | | | |
|---|---|---|---|
| 3,451,654 A * | 6/1969 | Johnson | 416/190 |
| 3,763,549 A | 10/1973 | Bonneville et al. | |
| 4,128,929 A * | 12/1978 | DeMusis | 29/889.1 |
| 4,333,239 A * | 6/1982 | Arrigoni | 33/535 |
| 4,400,915 A * | 8/1983 | Arrigoni | 451/365 |
| 4,589,175 A * | 5/1986 | Arrigoni | 29/889.1 |
| 5,088,888 A * | 2/1992 | Bobo | 415/170.1 |
| 5,562,419 A * | 10/1996 | Crall et al. | 416/190 |
| 6,007,628 A | 12/1999 | Ittleson et al. | |
| 6,034,344 A | 3/2000 | Ittleson et al. | |
| 6,082,291 A | 7/2000 | Ittleson et al. | |
| 6,233,822 B1 * | 5/2001 | Grossklaus et al. | 29/889.1 |
| 6,315,519 B1 | 11/2001 | Bagepalli et al. | |
| 6,886,422 B2 | 5/2005 | King et al. | |
| 6,892,931 B2 * | 5/2005 | Steplewski et al. | 228/119 |
| 6,974,503 B2 * | 12/2005 | Byrnes et al. | 118/500 |
| 6,982,123 B2 * | 1/2006 | Budinger et al. | 428/680 |
| 7,017,431 B2 | 3/2006 | King et al. | |
| 7,118,021 B2 | 10/2006 | Swartzbeck et al. | |
| 7,363,707 B2 * | 4/2008 | Powers | 29/889.1 |
| 7,503,113 B2 | 3/2009 | Gosling et al. | |
| 7,653,994 B2 * | 2/2010 | Dasilva et al. | 29/889.1 |
| 7,882,639 B2 * | 2/2011 | Powers | 29/898.1 |
| 2009/0031564 A1 * | 2/2009 | Meier | 29/888.021 |
| 2009/0175727 A1 * | 7/2009 | Bischof et al. | 416/179 |
| 2009/0265932 A1 * | 10/2009 | Lange | 29/889.1 |
| 2010/0050408 A1 * | 3/2010 | Minor et al. | 29/402.13 |
| 2011/0000084 A1 * | 1/2011 | Lange | 29/888.021 |
| 2011/0099810 A1 | 5/2011 | Stankowski et al. | |

* cited by examiner

*Primary Examiner* — Sean J Younger
(74) *Attorney, Agent, or Firm* — Dority & Manning, P.A.

(57) ABSTRACT

A method for repairing a shroud tile of a gas turbine is disclosed. The method may generally include removing a portion of the shroud tile along at least one of a first side and a second side of the shroud tile and securing at least one side rail to the shroud tile in place of the removed portion of the shroud tile.

12 Claims, 6 Drawing Sheets

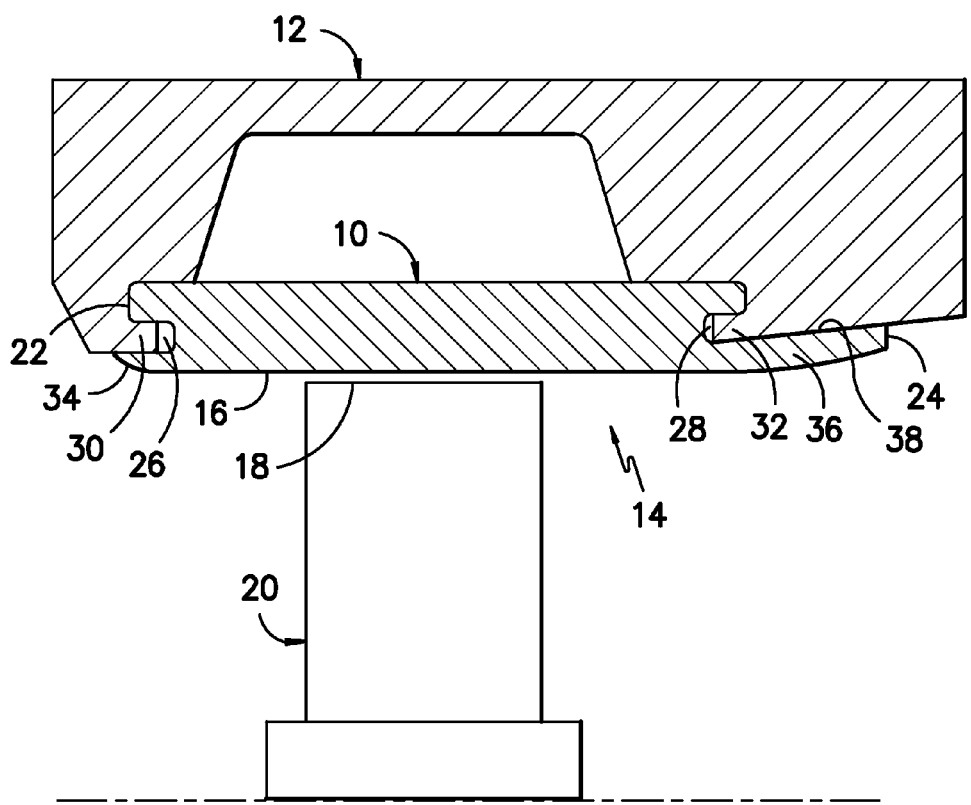
FIG. -1-
PRIOR ART

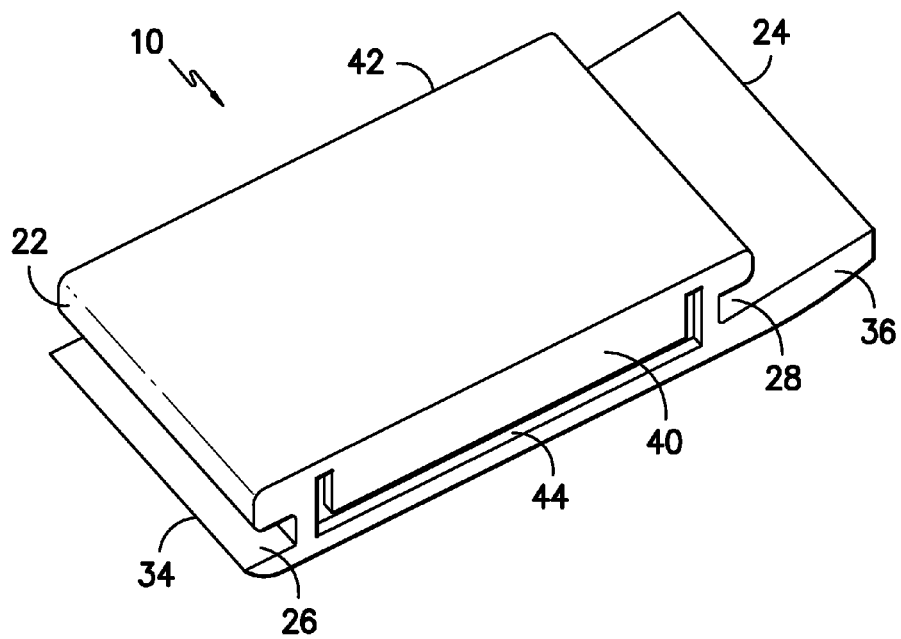
FIG. -2-
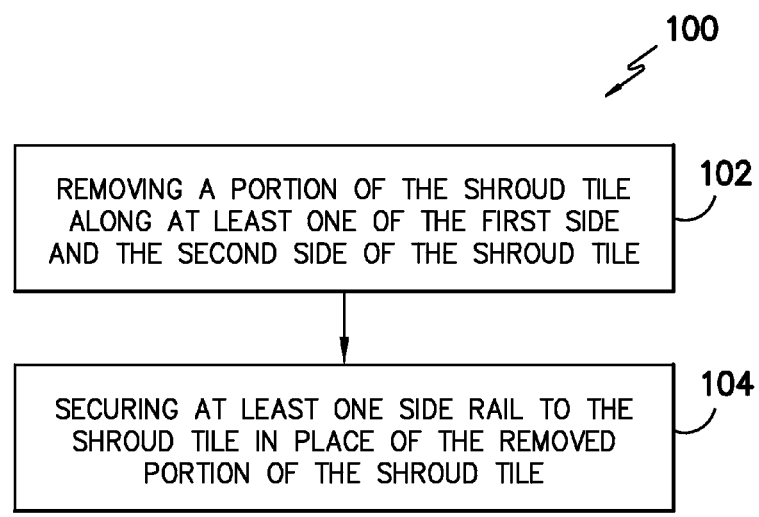
FIG. -3-

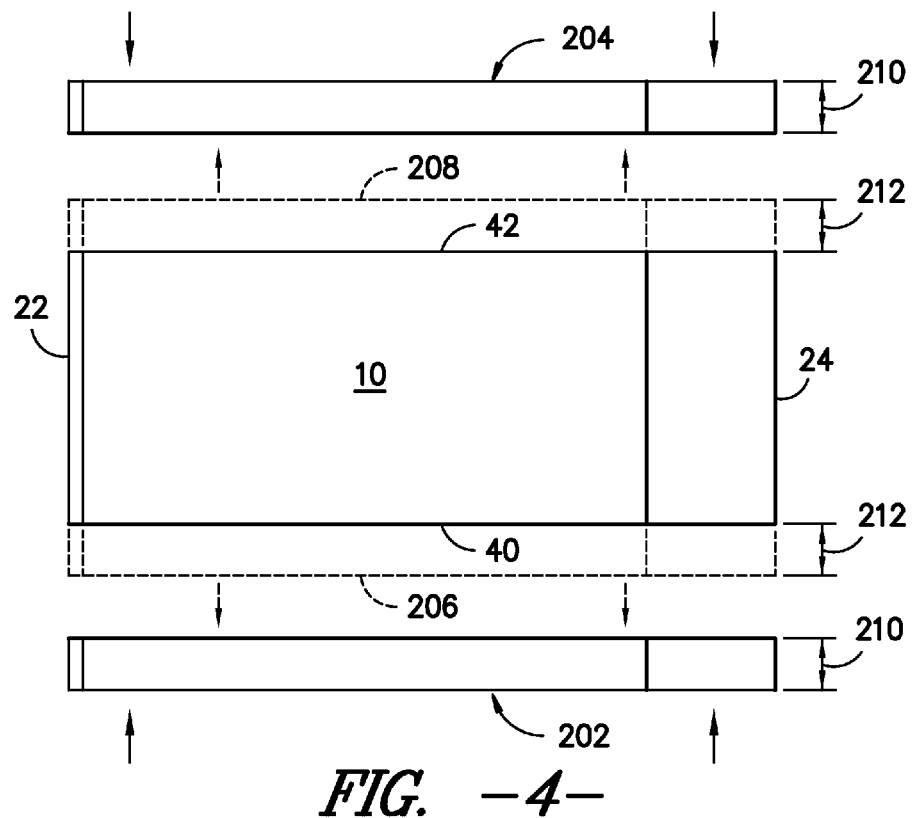
FIG. -4-
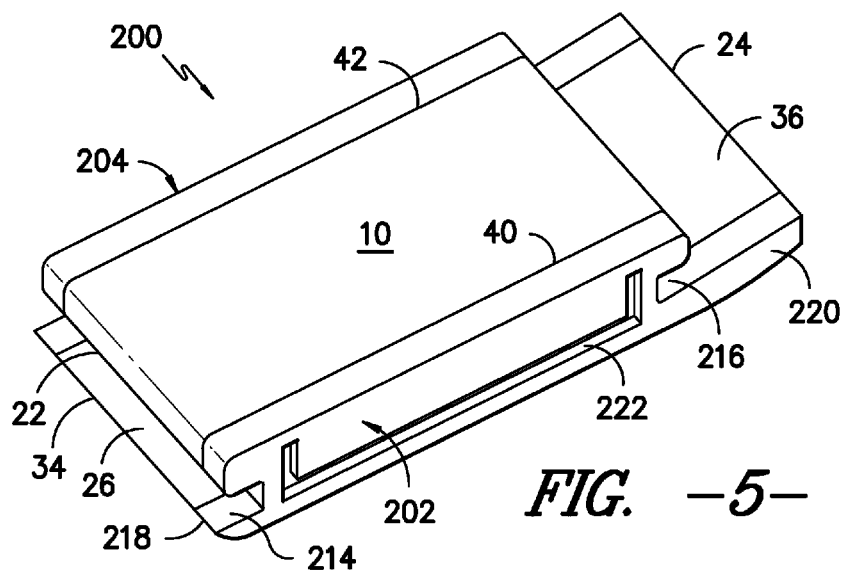
FIG. -5-

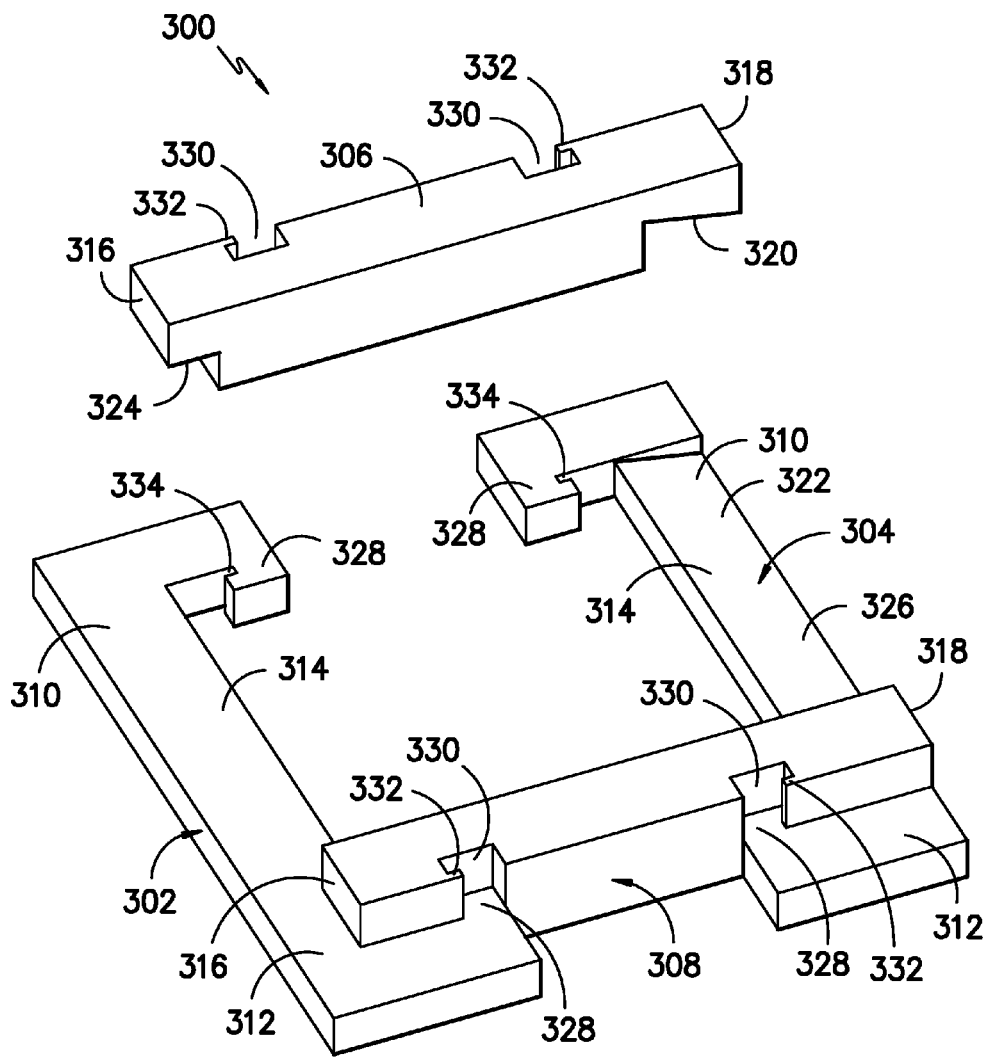
FIG. -6-

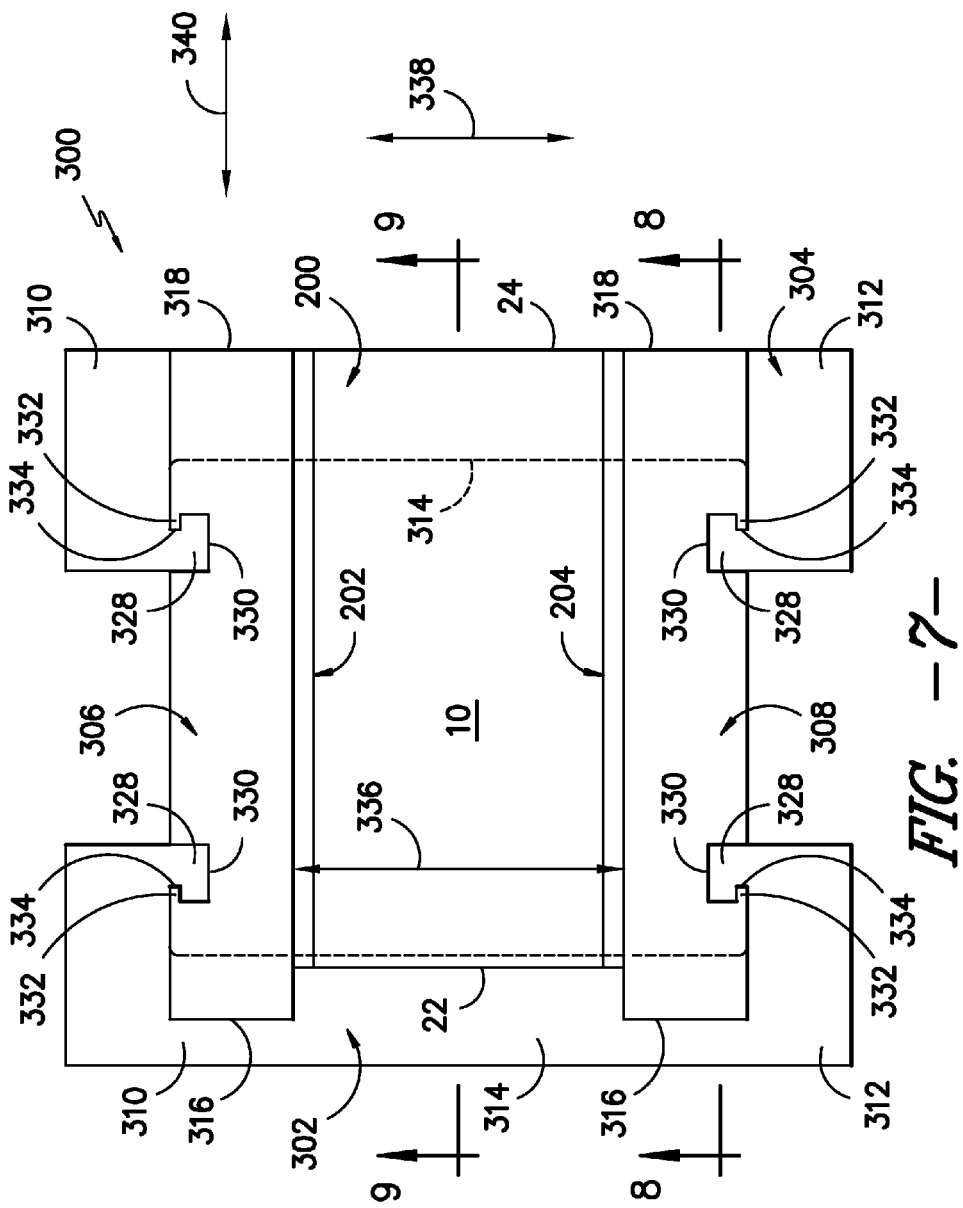
FIG. -7-

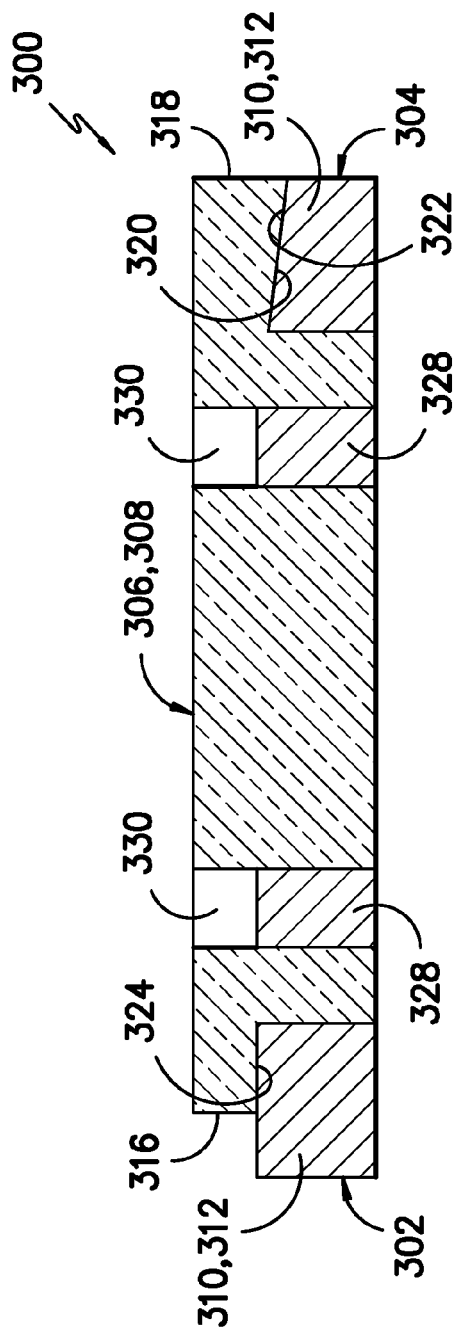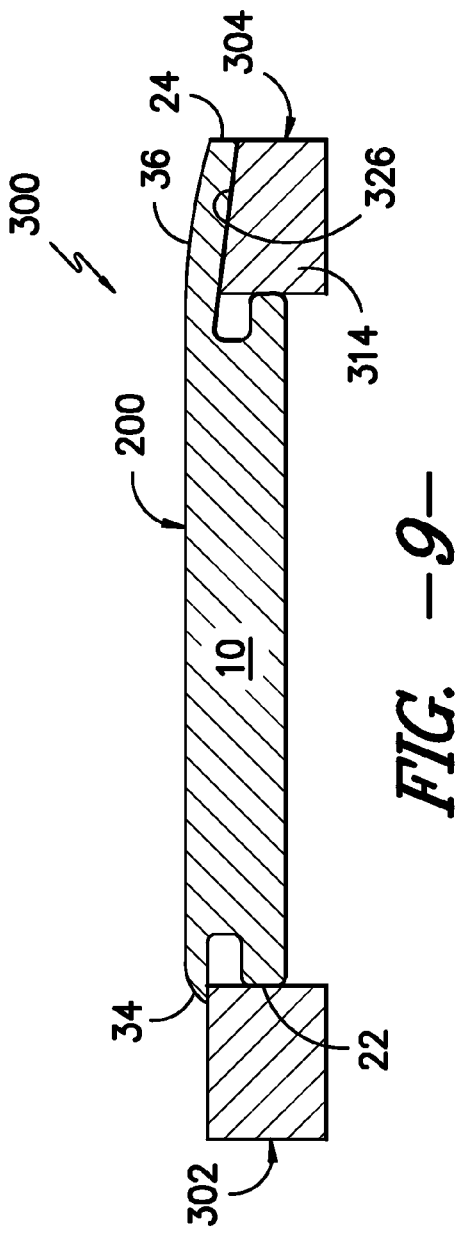

METHOD FOR REPAIRING A SHROUD TILE OF A GAS TURBINE

FIELD OF THE INVENTION

The present subject matter relates generally to gas turbines and, more particularly, to a method for repairing a shroud tile of a gas turbine.

BACKGROUND OF THE INVENTION

Gas turbines typically include a compressor section, a combustion section, and a turbine section. The compressor section pressurizes air flowing into the turbine. The pressurized air discharged from the compressor section flows into the combustion section, which is generally characterized by a plurality of combustors disposed in an annular array about the axis of the engine. Air entering each combustor is mixed with fuel and combusted. Hot gases of combustion flow from the combustion liner through a transition piece to the turbine section to drive the turbine and generate power. The turbine section typically includes a turbine rotor having a plurality of rotor disks and a plurality of turbine buckets extending radially outwardly from and being coupled to each rotor disk for rotation therewith. The turbine buckets are generally designed to capture and convert the kinetic energy of the hot gases of combustion flowing through the turbine section into usable rotational energy.

The turbine section also includes a substantially cylindrical turbine casing configured to contain the hot gases of combustion. The turbine casing typically supports a turbine shroud designed to encase or shroud the rotating components of the turbine rotor. As is generally understood, the turbine shroud may be formed from a plurality of shroud sections or tiles that, when installed around the inner circumference of the turbine casing, abut one another so as generally define a cylindrical shape surrounding the turbine rotor and forming the outer perimeter of the hot gas path of the turbine section. As such, the shroud tiles generally serve as a heat shield for the turbine casing.

Due to constant exposure with the hot gases of combustion flowing through the turbine section, the shroud tiles of the turbine shroud must often be repaired and/or replaced due to oxidation and/or other damage. For instance, seals, such as cloth seals, typically extend between seal slots defined in the sides of adjacent shroud tiles to seal the gap defined between the shroud tiles. Over time, the seals may fail leading to hot gas ingestion between adjacent shroud tiles. As such, the sides of each shroud tile may often be subject to heavy oxidation, particularly within the seal slots. To repair such damaged shroud tiles, conventional repair methods typically involve adding material using a welding and/or brazing process to build up the damaged side surfaces of the shroud tiles. Once the side surfaces are built up with the added material, the surfaces must then be ground down to establish the proper dimensions of the shroud tile and new seal slots must be machined into the surfaces. As such, this repair method is very time and labor intensive, thereby making it very costly to perform.

In addition, due to the volume of braze and/or weld material that must be used during the performance of the conventional repair method, the shroud tiles must be positioned upright (i.e., with one side of the shroud tile facing up) to build up the added material along the side of the shroud tile. Accordingly, each shroud tile may only be repaired one side at a time, further increasing the amount of time required to repair each shroud tile. As such, it is often the case that, when both sides of shroud tile need to be repaired, the damaged shroud tile may simply be scrapped to avoid the excessive time and costs needed for completely repairing the shroud tile.

Accordingly, a new method for repairing damaged shroud tiles that is more efficient and less costly would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for repairing a shroud tile of a gas turbine. The method may generally include removing a portion of the shroud tile along at least one of a first side and a second side of the shroud tile and securing at least one side rail to the shroud tile in place of the removed portion of the shroud tile.

In another aspect, the present subject matter is directed to a shroud tile assembly for a gas turbine. The shroud tile assembly may generally include a shroud tile configured for use within the gas turbine. The shroud tile may include a first end, a second end, and first and second sides extending between the first and second ends. In addition, the shroud tile assembly may include at least one side rail secured to at least one of the first side and the second side of the shroud tile.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates one embodiment of a conventional turbine casing and turbine shroud of a gas turbine, with the turbine shroud being formed from a plurality of shroud tiles (one of which is shown);

FIG. 2 illustrates a perspective view of the shroud tile shown in FIG. 1;

FIG. 3 illustrates a flow diagram of one embodiment of a method for repairing a shroud tile of a gas turbine;

FIG. 4 illustrates a top view of one embodiment of a shroud tile in the process of being repaired in accordance with the disclosed method;

FIG. 5 illustrates a perspective view of one embodiment of a shroud tile assembly that may be formed after a shroud tile is repaired in accordance with the disclosed method;

FIG. 6 illustrates a perspective view of embodiment of a fixture assembly that may be utilized to repair shroud tiles;

FIG. 7 illustrates a top view of the fixture assembly shown in FIG. 6, particularly illustrating a shroud tile and side rails positioned within the fixture assembly;

FIG. 8 illustrates a cross-sectional view of the fixture assembly shown in FIG. 7 taken about line 8-8; and FIG. 9 illustrates a cross-sectional view of the fixture assembly shown in FIG. 7 taken about line 9-9.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a method for repairing a shroud tile of a gas turbine. Specifically, in several embodiments, the method may include removing damaged portions of the shroud tile along its sides and securing replacement side rails to the shroud tile in place of the removed portions. By utilizing such a repair method, shroud tiles may be quickly and efficiently repaired. In addition, the resulting shroud tile assembly (including the original shroud tile and the replacement side rails) may be within dimensional tolerances without the need for additional machining, thereby reducing manufacturing and labor costs.

Moreover, the present subject matter is also directed to a fixture assembly that may be utilized in repairing a damaged shroud tile, such as by using the fixture assembly in performing the disclosed method. In several embodiments, the fixture assembly may be configured as a braze fixture to facilitate brazing the replacement side rails onto the sides of a shroud tile. For instance, the components of the fixture assembly may be formed from dissimilar materials having differing coefficients of thermal expansion. Thus, during the brazing thermal cycle when the shroud tile and replacement side rails are heated within the fixture assembly, the components of the fixture assembly may expand at differing rates, thereby applying a compressive force against the shroud tile and side rails. Application of such a compressive force may generally improve formation of the braze joint defined between the shroud tile and the side rails and may also assist in controlling the final dimension of the resulting shroud tile assembly. Moreover, the fixture assembly may also allow for both sides of a damaged shroud tile to be repaired at the same time, thereby reducing manufacturing and labor costs.

Referring now to the drawings, FIGS. 1 and 2 illustrate cross-sectional and perspective views of one embodiment of a conventional shroud tile 10. In particular, FIG. 1 illustrates a cross-sectional view of one embodiment of a portion of a turbine casing 12 and a turbine shroud 14 of a gas turbine, with the turbine shroud 14 being formed from a plurality of shroud tiles 10 (one of which is shown). Additionally, FIG. 2 illustrates a perspective view of the shroud tile 10 shown in FIG. 1.

As indicated above, the turbine shroud 14 of gas turbine may be formed from a plurality of shroud tiles 10 configured to be supported around the inner circumference of the turbine casing 12 so that an inner surface 16 of the shroud tiles 10 may be disposed adjacent to the tips 18 of the rotating buckets 20 of the turbine rotor (not shown). Thus, in several embodiments, the turbine casing 12 and shroud tiles 10 may define corresponding mating features such that the shroud tiles 10 may be installed around the inner circumference of the turbine casing 12. For instance, as shown in the illustrated embodiment, each shroud tile 10 may extend axially between a first end 22 and a second end 24, with each end 22, 24 defining a slot or channel 26, 28 configured to be supported by and/or engaged with a corresponding hooked projection 30, 32 of the turbine casing 12. Specifically, as shown in FIG. 1, the first end 22 of each shroud tile 10 may define a first channel 26 configured to receive and/or be engaged with a first hooked projection 30 extending from the turbine casing 12. Similarly, the second end 24 of each shroud tile 10 may define a second channel 28 configured to receive and/or be engaged with a second hooked projection 32 extending from the turbine casing 12. However, it should be appreciated that, in alternative embodiments, the turbine casing 12 and shroud tiles 10 may generally define any other suitable mating features that permit the shroud tiles 10 to be installed and/or supported around the inner circumference of the turbine casing 12.

Additionally, in one embodiment, one or more of the walls defining the channels 26, 28 of each shroud tile 10 may be elongated. For example, as shown in FIG. 1, the inner wall of the first channel 26 may be elongated so as to define a lip 34 that extends axially beyond the opposing wall of the first channel 26. Similarly, the inner wall of the second channel 28 may be elongated and may define an angled or curved projection 36 that extends axially beyond the opposing wall of the second channel 28. As shown in FIG. 1, in one embodiment, the angle or curvature of the projection 36 may be configured to generally correspond to the angle or curvature of an inner surface 38 of the turbine casing 12 at and/or adjacent to the second hooked projection 32.

Moreover, as particularly shown in FIG. 2, each shroud tile 10 may include a first side 40 and a second side 42 extending axially between its first and second ends 22, 24. In general, the sides 40, 42 of each shroud tile 10 may be configured to be sealed against the sides 40, 42 of adjacent shroud tiles 10 when the shroud tiles 10 are installed around the inner circumference of the turbine casing 12. Thus, in several embodiments, a seal slot 44 may be defined in each side 40, 42 of the shroud tiles 10 to allow a corresponding seal (e.g., a cloth seal) to be installed between the sides 40, 42 of adjacent shroud tiles 10. However, as described above, the seals installed between shroud tiles 10 may often fail, resulting in the sides 40, 42 of the shroud tiles 10 being exposed to the hot gases flowing through the turbine section of the gas turbine. Such exposure can lead to heavy oxidation and/or other damage to the sides 40, 42 of the shroud tiles 10.

Referring now to FIG. 3, there is illustrated a flow diagram of one embodiment of a method 100 for repairing a shroud tile of a gas turbine. As shown, the method 100 generally includes removing a portion of the shroud tile along at least one of the first side and the second side of the shroud tile 102 and securing at least one side rail to the shroud tile in place of the removed portion of the shroud tile 104. Specifically, in several embodiments, when damage has occurred to one or both of the sides 40, 42 of a shroud tile 10, the damaged portion(s) may be removed and replaced with a side rail 202, 204 (FIGS. 4 and 5) configured to be secured to the first and/or second side 40, 42 of the shroud tile 10.

For example, FIGS. 4 and 5 illustrate views of a shroud tile 10 that is being and has been repaired in accordance with the disclosed method 100, respectively. In particular, FIG. 4 illustrates a top view of a shroud tile 10 prior to replacement side rails 202, 204 being secured to the sides 40, 42 of the shroud tile 10. Additionally, FIG. 5 illustrates a perspective view of a repaired shroud tile assembly 200, particularly illustrating the shroud tile 10 after the replacement side rails 202, 204 have been secured thereon.

As particularly shown in FIG. 4, when damage has occurred to the first side 40 of a shroud tile 10, a first portion 206 of the shroud tile 10 (indicated by dashed lines) corresponding to the damaged portion of the shroud tile 10 along the first side 40 may be removed (e.g., by removing a strip of material along the first side 40 that extends between the first and second ends 22, 24 of the shroud tile 10). Similarly, when damage has occurred to the second side 42 of a shroud tile 10, a second portion 208 of the shroud tile 10 (indicated by dashed lines) corresponding to the damaged portion of the shroud tile 10 along the second side 42 may be removed (e.g., by removing a strip of material along the second side 42 that extends between the first and second ends 22, 24 of the shroud tile 10). It should be appreciated that the damaged portions 206, 208 of the shroud tile 10 may be removed using any suitable manufacturing/machining process known in the art. For example, in one embodiment, the damaged portions 206, 208 may be removed from the shroud tile 10 using a waterjet machining process. In other embodiments, the damaged portions 206, 208 may be removed using a grinding process, an electrical discharge machining (EDM) process, a laser cutting process or any other suitable manufacturing/machining process capable of removing the damaged portions 206, 208 from the sides 40, 42 of the shroud tile 10.

Referring still to FIGS. 4 and 5, upon removing the damaged portions 206, 208 of the shroud tile 10, one or more replacement side rails 202, 204 may then be secured to the shroud tile 10. For example, as shown in the illustrated embodiment, a first side rail 202 may be configured to be secured along the first side 40 of the shroud tile 10 in order to replace the removed, first portion 206 of the shroud tile 10. Similarly, a second side rail 204 may be configured to be secured along the second side 42 of the shroud tile 10 in order to replace the removed, second portion 208 of the shroud tile 10. However, in instances in which damage has only occurred to one of the sides 40, 42 of the shroud tile 10, it should be appreciated that only a portion of the shroud tile 10 along the damaged side may need to be removed and replaced with a corresponding side rail 202, 204.

It should also be appreciated that the side rails 202, 204 may be secured to the sides 40, 42 of each shroud tile 10 using any suitable attachment method and/or means known in the art. For example, in one embodiment, the side rails 202, 204 may be secured to the sides 40, 42 of each shroud tile 10 using a brazing process, such as a vacuum brazing process or a furnace brazing process. In another embodiment, the side rails 202, 204 may be secured to the sides 40, 42 of each shroud tile 10 using a welding process. In further embodiments, the side rails 202, 204 may be secured to each shroud tile 10 using suitable mechanical fasteners (e.g., pins, bolts, rivets and/or the like) and/or using any other suitable attachment method and/or means.

In addition, it should be appreciated that the dimensions and/or shape of the replacement side rails 202, 204 may generally correspond to the dimensions and/or shape of the portions 206, 208 of the shroud tile 10 being removed. For example, as shown FIG. 4, the side rails 202, 204 may define a width 210 generally corresponding to a width 212 of the removed portions 206, 208 of the shroud tile 10. Similarly, the side rails 202, 204 may be configured to define the same or a similar cross-sectional profile as the shroud tile 10. For example, as shown in FIG. 5, each side rail 202, 204 may be configured to extend axially along the entire length of the shroud tile 10 (i.e., between the first and second ends 22, 24 of the shroud tile 10) and may also define the same mating features as the shroud tile 10, such as by defining channels 214, 216 corresponding to the channels 26, 28 defined at the ends 22, 24 of the shroud tile 10, by including an elongated lip 218 corresponding to the lip 34 formed at the first end 22 of the shroud tile 10 and/or by including an elongated projection 220 corresponding to the projection 36 formed at the second end 24 of the shroud tile 10.

Additionally, as shown in FIG. 5, a seal slot 222 may be formed in each side rail 202, 204. For example, in several embodiments, the seal slot 222 may be formed using a waterjet machining process, a laser cutting process, an EDM process, a casting process and/or any other suitable machining/manufacturing process. As indicated above, the seal slots 222 may be configured to receive corresponding seals (not shown) for sealing the gap defined between adjacent shroud tiles 10 when the shroud tiles 10 are installed around the inner circumference of the turbine casing 12. It should be appreciated that, in one embodiment, the seal slots 222 may be pre-formed in the side rails 202, 204 (i.e., formed before the side rails 202, 204 are secured to the sides 40, 42 of the shroud tile 10). However, in another embodiment, the seal slots 222 may be formed in the side rails 202, 204 after the side rails 202, 204 are secured to the sides 40, 42 of the shroud tile 10.

Moreover, it should be appreciated that the side rails 202, 204 may generally be formed from any suitable material. For example, in several embodiments, the side rails 202, 204 may be formed from the same material as the material used to form the shroud tiles 10 (e.g., Inconel or any other suitable material). Alternatively, the side rails 202, 204 may be formed from a different material than the material used to form the shroud tiles 10. For instance, it may be desirable to form the side rails 202, 204 from a material that has better mechanical properties (e.g., increased oxidization resistance) than the material used to form the shroud tiles 10.

Referring now to FIGS. 6-9, one embodiment of a fixture assembly 300 that may be utilized to both locate a shroud tile 10 and its corresponding side rails 202, 204 relative to another and facilitate securing such side rails 202, 204 to the shroud tile 10 is illustrated in accordance with aspects of the present subject matter. In particular, FIG. 6 illustrates a perspective view of the fixture assembly 300. FIG. 7 illustrates a top view of the fixture assembly 300 having a shroud tile 10 and first and second side rails 202, 204 installed therein. FIG. 8 illustrates a cross-sectional view of the fixture assembly 300 shown in FIG. 7 taken about line 8-8. Additionally, FIG. 9 illustrates a cross-sectional view of the fixture assembly 300 shown in FIG. 7 taken about line 9-9.

As shown, in several embodiments, the fixture assembly 300 may be configured as four-piece assembly and may include a first support member 302, a second support member 304, a first guide block 306 and a second guide block 308. In general, the support members 302, 304 and guide blocks 306, 308 may be configured to be assembled together to form a rectangular frame for receiving both a shroud tile 10 to be repaired and its replacement side rail(s) 202, 204. For example, as shown in FIGS. 6 and 7, the first and second support members 302, 304 may be configured to be spaced apart from one another so as to generally define two parallel sides of the rectangular frame. Similarly, the first and second guide blocks 306, 308 may be spaced apart from one another and may be configured to extend transversely between the first and second support members 302, 304 so as to define the remaining sides of the rectangular frame.

In general, the first and second support members 302, 304 may each include an upper portion 310, a lower portion 312 and a middle portion 314 extending between the upper and lower portions 310, 312. The upper and lower portions 310, 312 of each support member 302, 304 may generally be configured to support and/or be engaged with at least a portion of the first and second guide blocks 306, 308. For example, as shown in the illustrated embodiment, the first guide block 306 may be configured to extend between the upper portions 310 of the support members 302, 304, with a first end 316 of the first guide block 306 overlapping and being supported by the upper portion 310 of the first support member 302 and a second end 318 of the first guide block 306 overlapping and being supported by the upper portion 310 of the second support member 203. Similarly, the second guide block 308 may be configured to extend between the lower portions 312 of the support members 302, 304, with a first end 316 of the second guide block 308 overlapping and being supported by the lower portion 312 of the first support member 302 and a second end 318 of the second guide block 308 overlapping and being supported by the lower portion 312 of the second support member 304.

Additionally, in several embodiments, the support members 302, 304 and guide blocks 306, 308 may include corresponding surface/overlapping features at the locations at which the guide blocks 306, 308 overlap the support members 302, 304. For example, as particularly shown in FIG. 8, in one embodiment, the second end 316 of each guide block 306, 308 may define an angled surface 320 configured to overlap and/or engage a corresponding angled surface 322 defined by the upper and lower portions 310, 312 of the second support member 304. In addition to such angled features or as an alternative thereto, the support members 302, 304 and/or guide blocks 306, 308 may include any other suitable surface/overlapping features. For example, a shown in FIG. 8, in one embodiment, the first end 316 of each guide block 306, 308 may define a stepped surface 324 configured to be engaged against and/or supported by the upper and lower portions 310, 312 of the first support member 302.

Moreover, the middle portion 314 of each support member 302, 304 may generally be configured to support both the shroud tile 10 to be repaired and its corresponding side rails 202, 204 within the fixture assembly 300. In particular, when the shroud tile 10 and side rails 202, 204 are positioned within the fixture assembly 300 between the first and second guide blocks 306, 308, the ends of the shroud tile 10 and side rails 202, 204 may generally overlap and/or be supported by the middle portions 314 of the support members 302, 304. For example, as shown in FIG. 9, the lip 34 defined at the first end 22 of the shroud tile 10 and the corresponding lip 218 (FIG. 5) of the side rails 202, 204 may be configured to overlap and/or engage the middle portion 314 of the first support member 302. Similarly, the angled and/or curved projection 36 defined at the second end 24 of the shroud tile 10 and the corresponding projection 220 of the side rails 202, 204 may be configured to overlap and/or engage a corresponding angled surface 326 defined by the middle portion 314 of the second support member 304. Accordingly, the shroud tile 10 and side rails 202, 204 may be suspended and/or otherwise supported between the first and second support members 302, 304 when such components are installed within the fixture assembly 300.

It should be appreciated that the support members 302, 304 and guide blocks 306, 308 may also include alignment and/or engagement features configured such that the support members 302, 304 and guide blocks 306, 308 are properly aligned within one another and/or properly engaged when such components are assembled together to form the fixture assembly 300. For example, as shown in FIGS. 6-8, in several embodiments, the support members 302, 304 may have a "C-shape" and may include projections 328 configured to be received within corresponding slots 330 defined in the guide blocks 306, 308. As such, when the first and second guide blocks 306, 308 are positioned over the support members 302, 304, the projections 328 may be slidably received within the slots 330, thereby ensuring proper alignment and/or engagement of the guide blocks 306, 306 with the support members 302, 304. In addition, the support members 302, 304 and guide blocks 306, 308 may also include further alignment and/or engagement features. For instance, as particularly shown in FIGS. 6 and 7, each slot 330 defined by the guide blocks 306, 308 may include a protuberance 332 extending therein that is configured to be received within a corresponding recess 334 defined in each projection 328 of the support members 302, 304. It should be appreciated that, in alternative embodiments, the support members 302, 304 and guide blocks 306, 308 may include any other suitable alignment and/or engagement features.

Referring still to FIGS. 6-8, in several embodiments, the fixture assembly 300 may be utilized in performing embodiments of the disclosed method 100. In particular, the fixture assembly may be designed to simplify and/or enhance the efficiency and/or accuracy of securing the side rails 202, 204 onto the sides 40, 42 of a shroud tile 10. For example, by configuring the fixture assembly 300 as described above, the shroud tile 10 and the side rails 202, 204 may be properly positioned relative to one another when such components are installed within the fixture assembly 300. Specifically, as shown in FIG. 7, a width 336 defined between the guide blocks 306, 308 may generally correspond to the combined width of the shroud block 10 and side rails 202, 204. As such, when the shroud block 10 and side rails 202, 204 are installed within the fixture assembly 300, the shroud block 10 and side rails 202, 204 may be aligned relative to one another in the side-to-side direction (indicated by arrow 338). Additionally, as shown in FIG. 9, the mating features of both the shroud tile 10 and the side rails 202, 204 (e.g., the lips 34, 218 and projections 36, 220) may be configured to engage/overlap/contact the support members 302, 304 at the same locations, thereby positioning the shroud tile 10 and the side rails 202, 204 relative to one another in the longitudinal direction (indicated by arrow 320). Such precise alignment of the shroud tile 10 and the side rails 202, 24 may be particularly advantageous when such components are being secured together using a brazing and/or welding process.

Additionally, in embodiments in which the side rails 202, 204 are secured to the sides 40, 42 of a shroud tile 10 using a brazing process, the fixture assembly 300 may also be configured to apply a compressive load against the side rails 202, 204 (i.e., in the side-to-side direction 338), thereby ensuring that the width of the resulting shroud tile assembly 200 is to the proper dimension. Specifically, in several embodiments, the materials used to form the support members 302, 304 and guide blocks 306, 308 may be selected such that the fixture assembly 300 restricts thermal expansion of the shroud tile 10 and side rails 202, 204 in the side-to-side direction 338 while heating such components within the fixture assembly 300 during the brazing thermal cycle. For instance, in one embodiment, the guide blocks 306, 308 may be formed from a material (e.g., Inconel or any other suitable material) that has the same or a similar coefficient of thermal expansion as the material(s) used to form the shroud tile 10 and the side rails 202, 204. In addition, the support members 302, 304 may be formed from a material (e.g., TZM Molybdenum or any other suitable material) that has a lower coefficient of the thermal expansion than the material(s) used to form the guide blocks 306, 308, shroud tile 10 and side rails 202, 204. As such, when the fixture assembly 300, shroud tile 10 and side rails 202, 204 are heated during the brazing process (e.g., in a furnace or vacuum chamber), the guide blocks 306, 308, shroud tile 10 and side rails 202, 204 may expand together in the longitudinal direction 340 (e.g., by pushing the support members 302, 304 away from one another). However, due to the low coefficient of thermal expansion of the support members 302, 304, the outward thermal expansion of the guide blocks 306, 308, shroud tile 10 and side rails 202, 204 may be restricted in the side-to-side direction 338, thereby squeezing the shroud tile 10 and side rails 202, 204 together within the fixture assembly 300. Thus, by controlling the dimensions of the shroud tile 10, the side rails 202, 204 and the components of the fixture assembly 300, the resulting shroud tile assembly 200 may be to the proper dimensions without the necessity of further machining and/or processing.

It should be appreciated that, although the embodiments illustrated herein show two side rails 202, 204 being installed within the fixture assembly 300, the fixture assembly 300 may also be utilized to facilitate securing a single side rail to a shroud tile 10, such as in instances when only one of the sides 40, 42 of the shroud tile 10 has been oxidized and/or otherwise damaged and needs to be repaired.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for repairing a shroud tile of a gas turbine, the shroud tile comprising a first end, a second end and first and second sides extending axially between the first and second ends, the shroud tile extending radially between an inner surface and an outer surface, the method comprising:
    removing a strip of material from the shroud tile along at least one of the first side or the second side of the shroud tile that extends axially between the first and second ends and radially between the inner and outer surfaces such that a portion of each of the inner and outer surfaces is defined on the strip material prior to removal; and
    securing at least one side rail to the shroud tile in place of the removed strip of material, the at least one side rail extending axially between the first and second ends and radially between the inner and outer surfaces so as to at least partially define the removed portions of the inner and outer surfaces.

2. The method of claim 1, wherein removing a strip of material from the shroud tile along at least one of the first side or the second side of the shroud tile comprises:
    removing a first strip of material from the shroud tile along the first side of the shroud tile; and
    removing a second strip of material from the shroud tile along the second side of the shroud tile.

3. The method of claim 2, wherein securing at least one side rail to the shroud tile in place of the removed strip of material comprises:
    securing a first side rail to the shroud tile in place of the first strip of material; and
    securing a second side rail to the shroud tile in place of the second strip of material.

4. The method of claim 1, Wherein securing at least one side rail to the shroud tile in place of the removed strip of material comprises securing the at least one side rail to the shroud tile using a brazing process.

5. The method of claim 1, wherein securing at least one side rail to the shroud tile in place of the removed strip of material comprises securing the at least one side rail to the shroud tile using a welding process.

6. The method of claim 1, further comprising forming a seal slot in the at least one side rail.

7. The method of claim 6, wherein forming a seal slot in the at least one side rail comprises forming the seal slot in the at least one side rail before or after the at least one side rail is secured to the shroud tile.

8. The method of claim 1, further comprising positioning the shroud tile and the at least one side rail within a fixture assembly prior to securing the at least one side rail to the shroud tile.

9. The method of claim 8, wherein the fixture assembly comprises first and second support members and first and second guide blocks that, when assembled together, form a frame for receiving the shroud tile and the at least one side rail.

10. The method of claim 9, further comprising heating the shroud tile and the at least one side rail within the fixture assembly.

11. The method of claim 10, wherein the first and second guide blocks are formed from a material that has the same or a similar coefficient of thermal expansion as the material used to form at least one of the shroud tile or the at least one side rail and the first and second support members are formed from a material that has a lower coefficient of thermal expansion than the material used to form the first and second guide blocks.

12. The method of claim 1, wherein removing a strip of material from the shroud tile along at least one of the first side or the second side of the shroud tile comprises removing the strip of material from the shroud the using at least one of a waterjet process, a laser cutting process, a EDM process and a grinding process.

* * * * *